United States Patent
Fiter et al.

(10) Patent No.: US 7,146,177 B2
(45) Date of Patent: Dec. 5, 2006

(54) RADIO ACCESS NETWORK FOR A MOBILE RADIO COMMUNICATIONS SYSTEM AND AN OPERATING METHOD THEREFOR

(75) Inventors: Bruno Fiter, Lannion (FR); Hans-Ulrich Flender, Ulm (DE); Notker Gerlich, Haar (DE); Alfred Lupper, Aystetten (DE); Chris Larmour, München (DE); Thomas Reim, Balzheim (DE); Eddy Troch, Lint (BE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 10/380,797

(22) PCT Filed: Sep. 10, 2001

(86) PCT No.: PCT/DE01/03473

§ 371 (c)(1),
(2), (4) Date: Sep. 2, 2003

(87) PCT Pub. No.: WO02/28130

PCT Pub. Date: Apr. 4, 2002

(65) Prior Publication Data

US 2004/0053627 A1 Mar. 18, 2004

(30) Foreign Application Priority Data

Sep. 19, 2000 (DE) ................. 100 46 342

(51) Int. Cl.
*H04Q 7/20* (2006.01)

(52) U.S. Cl. ............. 455/456.1; 455/517; 455/524

(58) Field of Classification Search ............. 455/456.1, 455/455, 456.2, 516, 517, 524, 525, 560, 455/561; 370/328
See application file for complete search history.

(56) References Cited

FOREIGN PATENT DOCUMENTS

| EP | 0 898 438 A2 | 2/1999 |
|----|---|---|
| EP | 1033893 A1 | 9/2000 |

(Continued)

OTHER PUBLICATIONS

Universal Mobile Telecommunications System (UMTS); Technical Specification, UTRAN Overall Description (3G TS 25.401 version 3.30 Release 1999), ETSI TS 125 401 v3.3.0 (Jun. 2000), pp. 1-36.

*Primary Examiner*—Melur Ramakrishnaiah
(74) *Attorney, Agent, or Firm*—Staas & Halsey LLP

(57) ABSTRACT

The invention relates to a radio access network (RAN) for a mobile radio communications system and to an operating method therefor. The radio access network has a number of first nodes (UPS1, UPS2,), which are each assigned to a subarea (A, a) of a geographical area, and which serve for exchanging useful data between terminals (UE), which are located in the relevant subarea, and a primary network (CN). The radio access network also has at least one second node (RCS1, RCS2), which comprises a number of signaling functionalities (UEF) for exchanging signaling data with the each respective terminal (UE). The second node (RCS1, RCS2, . . . ) is connected to a number of first nodes (UPS1, UPS2, . . . ) in order to exchange signaling data with a terminal (UE) via those first nodes (UPS1, UPS2, . . . ) with which this terminal (UE) exchanges useful data. When the terminal passes into the subarea of another first node, the transmission of useful data shifts from the previous node to this other first node, whereby a shifting of the signaling functionality is unnecessary.

13 Claims, 2 Drawing Sheets

FOREIGN PATENT DOCUMENTS

| | | |
|---|---|---|
| WO | WO 95/08897 | 3/1995 |
| WO | WO 99/66740 | 12/1999 |
| WO | WO 00/11878 | 3/2000 |
| WO | WO 00/67499 | 11/2000 |
| WO | WO 01/58086 A2 | 8/2001 |
| WO | WO 01/58187 A1 | 8/2001 |

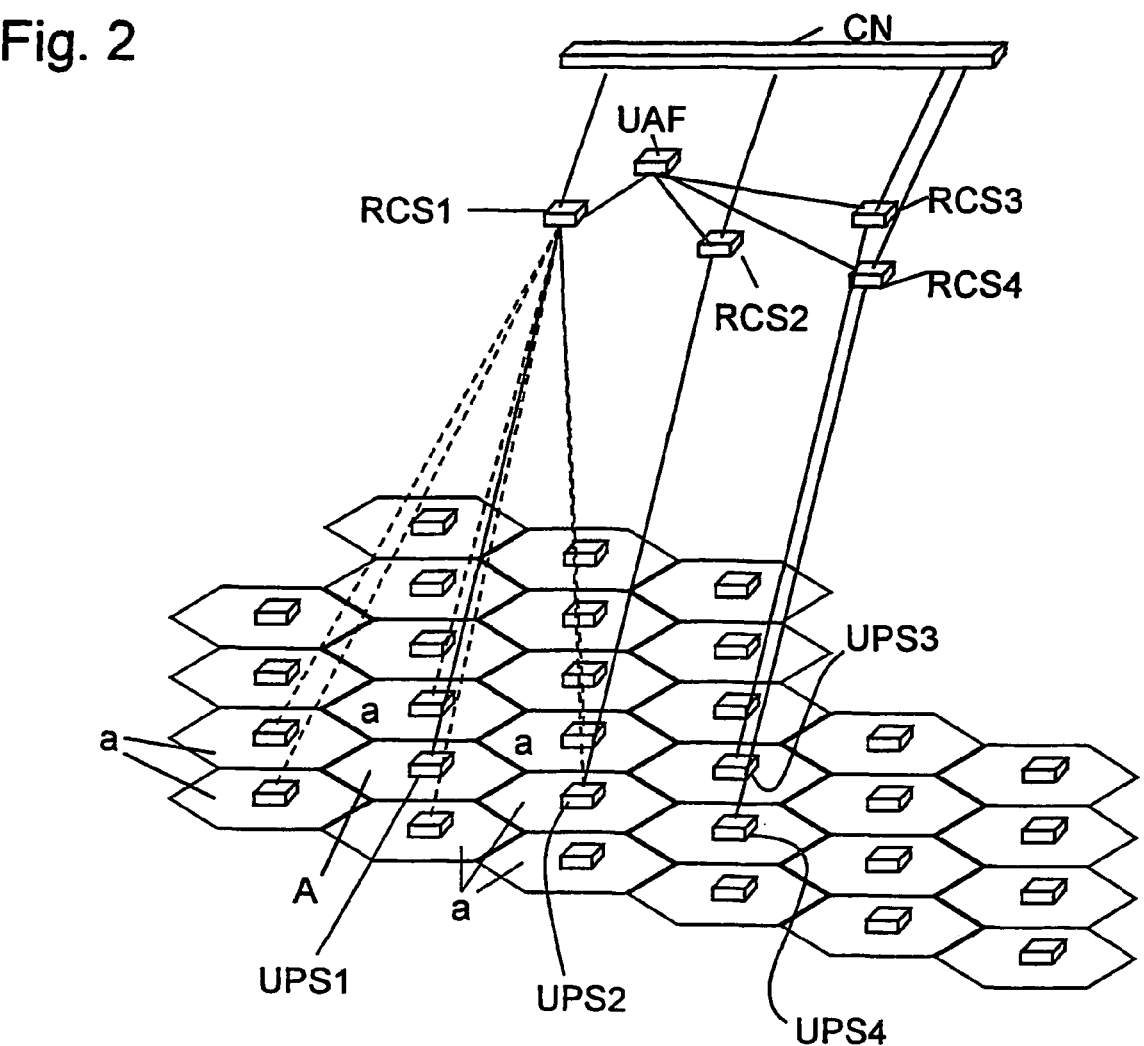

RADIO ACCESS NETWORK FOR A MOBILE RADIO COMMUNICATIONS SYSTEM AND AN OPERATING METHOD THEREFOR

CROSS REFERENCE TO RELATED APPLICATIONS

This application is based on and hereby claims priority to PCT Application No. PCT/DE01/03473 filed on 10 Sep. 2001 and 100 46 342.8 filed on 19 Sep. 2000, the contents of which are hereby incorporated by reference.

BACKGROUND OF THE INVENTION

The present invention relates to a radio access network for a mobile radio communications system and a method for the operation thereof.

Mobile radio communications systems may be broken down into a primary network, in which useful data and signaling data from a multiplicity of terminals is sent over large distances by wire, and a radio access network, also referred to as a RAN, which generally includes a plurality of nodes connected to one or more radio stations. The purpose of these nodes being to convert data received from the terminals into a format suitable for transmission through the primary network and, in the opposite direction, to adapt the format of data received from the primary network for radio transmission and to forward it to the radio station within the transmission area of which the respective terminal is located.

The transmission of useful data and signaling data to the various terminals is a particularly complex task because the radio station within the transmission area of which each of the registered terminals are located at any given time must be known within the radio access network in order for it to be possible to direct data destined for the terminal correctly. Moreover, the mobility of the terminals may necessitate the transmission area in which a given terminal is located to change at any time. The access network must therefore be in a position to change the data route for a terminal at any time while communication is ongoing without any data being lost in the process.

The data to be routed includes both useful data, which is data input by a user via a transmitter terminal, that has a defined meaning outside the mobile radio communications system and is to be received and output by a receiver terminal in, where possible, its original form, and signaling data, which is generated and processed to control internal operations of the mobile radio communications system in connection with the transmission of the useful data. Both types of data have to be exchanged between the radio access network and a terminal communicating therewith.

A distinction may be drawn in the access network between functionalities that are responsible for the transmission of the useful data from a node to a terminal and functionalities that are responsible for the transport of the signaling data. The former are referred to here as transport functionalities or user plane functions and the latter as signaling functionalities or control plane functions. The signaling functionalities include, for example, tasks such as the management of radio resources or line-conducted signaling channels to the primary network, mobility management and the forwarding of signaling information not specific to the radio access network to the primary network.

The signaling functionalities in current GSM and UMTS mobile radio communications standards are held in each case at those physical nodes of the network that also serve as concentrators for the user data traffic for multiple master stations. This node is the base station controller (BSC) in the GSM standard and is known as the serving radio network controller (S—RNC) under UMTS. Each of these network nodes contains both the signaling functionality and the transport functionality for a terminal that is located in the transmission area of a connected base station. Signaling functionality and transport functionality for a given terminal are always held together at the same physical node, so they receive the same physical address.

When an active terminal in an access network of this type leaves the geographical area covered by one node and enters an area covered by another node, both the transport functionality and the signaling functionality have to be shifted to the new node. This operation entails significant signaling activity within the access network, which takes time and reduces the transport capacity of the network for useful data.

SUMMARY OF THE INVENTION

One aspect of the present invention is to specify a radio access network for a mobile radio communications system and an operating method therefor that make it possible to keep the signaling activity required when a terminal moves from the area of an old node into the area of a new node to a low level and thereby facilitate cost-effective operation of the network.

One of the basis of the invention is the essential idea of separating transport and signaling functionality.

It thus resolves the problem on the one hand using a radio access network for a mobile radio communications system having a plurality of first nodes, each allocated to a subarea of a geographical area covered by the radio access network and which serve for exchanging useful data between terminals located in the relevant subarea on one side and a primary network of the mobile radio communications network on the other side. And at least one second node, which exhibits a plurality of functional units, designated as signaling functionalities, for exchanging signaling data with, in each case, one terminal and internal signaling associated therewith, characterized in that the second node is connected to a plurality of first nodes in order to exchange signaling data with a terminal via that first node with which this terminal also exchanges useful data.

The multiplicity of signaling functionalities required to supply multiple terminals can be realized at a node in each case by a multiplicity of circuits or circuit groups, each of which can be allocated to one terminal in order to satisfy the signaling requirements thereof. They can also, however, in an abstract sense be shares in the processing work, for example shares of processor time, of a physically indivisible processing unit that are assigned to the individual terminals as required.

The capacity of the second node to communicate with a multiplicity of first nodes, provided for according to an aspect of the invention, results in no longer necessitating the shifting of the signaling functionality assigned to a terminal to another location in the access network when the terminal moves into the area of a new first node. It is sufficient in such a case merely to transfer the transport functionality to the new first node. All that has to happen for the signaling to continue is for the signaling functionality to be informed of the new first node to which the signaling data has to be sent once the terminal has moved in order to be able to reach the terminal.

The transport of the useful data is preferably organized analogously to the signaling such that the first nodes have at their disposal, in each case, a multiplicity of transport functionalities, each of which can be assigned to a terminal as required and carries out the exchange of the useful data with the terminal. This transport functionality and the signaling functionality are assigned to a terminal individually in each case when a communication is set up, so it is desirable for each of the functionalities to have a different address that can be used for exchanging useful data and/or signaling data in the access network.

A first, straightforward development of the radio access network according to an aspect of the invention provides for one second node, which is connected to every first node. This entails a centralization of the signaling functionalities for the whole access network at the one second node.

The radio access network according to a preferred second embodiment includes a multiplicity of second nodes, with every second node communicating, in each case, with at least one first node, designated as its core node, and also with every other first node in the access network whose subareas adjoin the subarea of the core node. When a terminal located in the subarea allocated to such a core node sets up a communication and is assigned a signaling functionality at a second node, it can move through the subareas of all core nodes and the nodes adjoining thereto without the signaling functionality having to be shifted. It should be recalled that such a subarea in a GSM radio communications system, for example, corresponds in each case to one MSC region and it is known that only very few communications are maintained in more than two MSC regions in succession. It will generally be sufficient, therefore, for each second node to be allocated precisely one core node in order for it to be possible to support communications started in the area of this core node through to their conclusion without having to shift the signaling functionality.

Although the total number of connections required for the transmission of signaling data between the first and second nodes is larger in this second development than in the first, the smaller number of first nodes connected in each case means that less outlay is required to ensure correct forwarding of the signaling data and the connections remain shorter than in the first development.

Each first node is preferably core node for at least one second node. This makes it possible for each communication started in the radio communications system to be continued without shifting of the signaling functionality even if the terminal involved in the communication moves out of the area of the node in which the communication was started and into the area of a neighboring node.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a block diagram of a second access network according to the invention.

DETAILED DESCRIPTION OF THE PREFERRED EMBODIMENT

Figure 1:
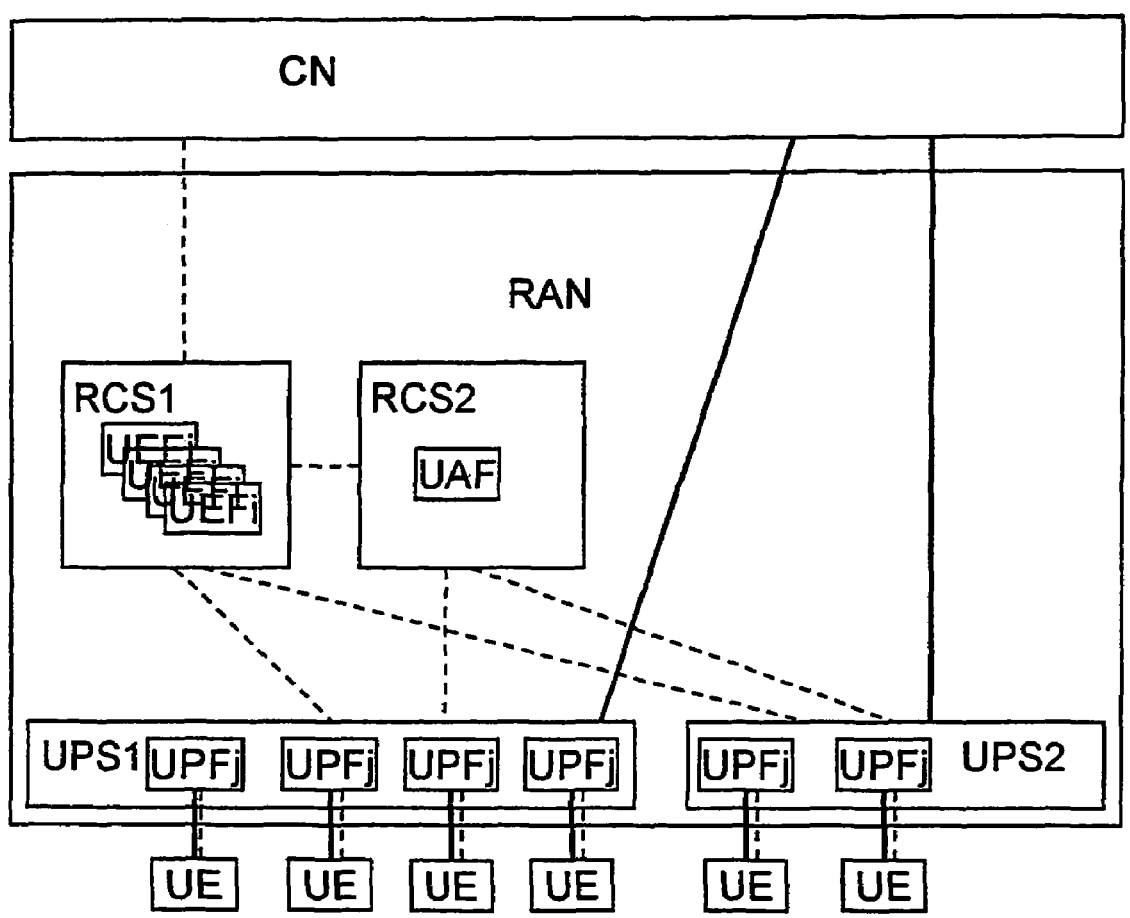
FIG. 1 shows a block diagram of a radio access network according to the invention between a primary network and a multiplicity of terminals.

Reference will now be made in detail to the preferred embodiments of the present invention, examples of which are illustrated in the accompanying drawings, wherein like reference numerals refer to like elements throughout.

The access network RAN shown in FIG. 1 includes a multiplicity of first nodes, also designated as user plane servers UPS, two of which, UPS1 and UPS2, are shown in the figure. Each of these first nodes UPS1, UPS2 is connected to a multiplicity of base stations (not shown in the figure) and communicates by radio via these base stations with a multiplicity of terminals UE. Useful data traffic, shown in the figure as a bold solid line, takes place in the access network RAN between the first node and the primary network CN on the one side and the terminals UE on the other side.

Each first node has at its disposal a multiplicity of transport functionalities UPF (user plane functions), each of which is allocated an address within the access network RAN, which address is used to guide data packets intended for a specific terminal UE to the transport functionality UPF that is communicating with the terminal UE concerned.

The access network RAN additionally has at its disposal a second type of node, designated as RCS1, RCS2 (radio control server) in the figure, which nodes are responsible for the exchange of signaling data within the access network and between the terminals UE and the primary network CN. The second node RCS1 has at its disposal a multiplicity of functional units, designated as signaling functionalities UEF (user equipment function), each of which is assigned to precisely one active terminal, which signaling functionalities UEF are responsible for the tasks associated with the signaling of the assigned terminal. The signaling functionalities UEF are implemented here as abstract shares in the processing work of the second node RCS1. They exist in each case only for as long as the terminal assigned to them maintains a communication with the access network RAN. Each of the signaling functionalities is assigned a discrete address with the help of which address signaling data concerning the terminal assigned in each case is conveyed within the access network.

The second node RCS2 contains an administration unit UAF (user allocation function) that is notified by a first node such as the node UPS1 as soon as a terminal UE attempts to set up a communication with the node UPS1 concerned. The administration unit UAF assigns a signaling functionality UEF at the second node RCS1 to the terminal UE in response and sends the address of this second node RCS1 to the first node UPS1 so that the latter can address signaling information concerning the terminal correctly to the assigned signaling functionality UEF.

Useful data coming from the primary network CN and destined for the terminal UE is forwarded to the terminal UE directly via the first node UPS1 for as long as the terminal UE concerned remains within the area of the first node UPS1. Signaling data coming from the primary network CN, on the other hand, first passes through the second node RCS1, from where it is forwarded to the correct first node by the assigned signaling functionality.

When the terminal UE leaves the geographical area covered by the first node UPS1 and moves into that covered by the node UPS2, the corresponding transport functionality UPF at the node UPS1 is withdrawn and set up anew at the node UPS2. The exchange of signaling data required for this purpose is processed by the corresponding signaling functionality UEF of the second node RCS1. The signaling functionality UEF itself, however, remains at its node RCS1. This means that only those parameters of the communication being maintained by the terminal that are required for the useful data traffic have to be passed on to the node UPS2 when the terminal switches to the node UPS2; those parameters that are required merely for the signaling do not have to be passed on to the node RCS2. The volume of signaling data to be exchanged within the access network RAN in connection with the movement of the terminal UE is thus smaller than in the known case in which both transport functionality and signaling functionality have to be shifted, so the transition process can be completed more quickly and puts only a slight load on the transport capacity of the access network.

The signaling functionalities UEF and the administration unit UAF, which are situated at different second nodes RCS1, RCS2 in the development of FIG. 1, may of course also be combined at a single node.

It is also conceivable for the access network to have just a single administration unit UAF but a multiplicity of second nodes equipped with signaling functionalities. This case is considered in FIG. 2. The totality of the hexagonal fields A, a in this figure symbolizes the geographical area across which the access network RAN extends. Each individual hexagon A, a corresponds to that subarea covered by the base stations connected to a given first node. Each of the first nodes UPS1, UPS2, . . . allocated to each of these subareas is shown as a box within a hexagonal field A, a. Each second node RCS1, RCS2, . . . is connected to a multiplicity of first nodes UPS1, UPS2, . . . for the exchange of signaling information; the full complement of these connections, however, is shown in the form of solid or dashed lines only for the second node RCS1. A connection shown by a solid line runs from the second node RCS1 to the first node UPS1. The node RCS1 is designated here as the core node of the second node RCS1, as the subarea A that it serves effectively forms the core of the region served by the second node RCS1: it is surrounded by subareas a, whose first nodes are likewise connected to the second node RCS1, in this case via the connections shown by dashed lines.

When a terminal sets up a communication in the subarea A of the first node UPS1, the administration unit UAF assigns it a signaling functionality at the second node RCS1 provided one is available. The terminal can then move out of the subarea A into all surrounding subareas a without it becoming necessary to shift its signaling functionality from the second node RCS1 to a different second node.

Each first node UPS1, UPS2, . . . is core node for at least one second node RCS1, RCS2, . . . in order to realize this advantage in all subareas A, a of the access network.

Virtually every first node is as a result connected to a multiplicity of second nodes: it is connected, as shown by a solid line, to that second node for which it is the core node and to another second node, as shown by a dashed line, in respect of which it belongs to the border area of the region served. This allocation of one first node to multiple second nodes, as is shown in the figure, for example, for the first node UPS2, which is connected to the second nodes RCS1 and RCS2, has the additional advantage of increased flexibility in the assignment of signaling functionalities to a terminal UE: if a terminal UE in the area of the first node UPS2 wishes to set up a connection and there is no signaling functionality free at the second node RCS2, the terminal UE can be assigned a signaling functionality at the node RCS1.

A first variant of this development provides for each first node to be allocated to precisely one second node as core node. This means that there are exactly the same number of first nodes UPS and second nodes RCS. It is naturally expedient in this variant to arrange a first node and the second node for which the former is the core node together in one structural unit. The access network presented here differs significantly from the known access networks, in which signaling and useful data transport functionalities are similarly brought together in a single structural unit, in that the second nodes of the access network presented here are also able to exchange signaling data directly with the first nodes of adjoining subareas and that, as already specified with reference to FIG. 1, the different addresses of signaling and transport functionality mean that each can be addressed independently of the other.

It is a characteristic feature of this first variant that the connections between the first and second nodes are not longer in total in each case than the extent of a subarea A, a, whereas significantly longer connections can come into being in the case considered in FIG. 1, in which signaling functions UEF are available at just a single second node; the number of connections required is though very high. It is thus expedient, in order to reduce this number of connections, for each first node UPS1, UPS2, . . . to be allocated to precisely one second node as core node but for each of the second nodes to have a multiplicity of first nodes as core node as shown in FIG. 2 by the example of the second node RCS4.

The invention has been described in detail with particular reference to preferred embodiments thereof and examples, but it will be understood that variations and modifications can be effected within the spirit and scope of the invention.

The invention claimed is:

1. A radio access network for a mobile radio communications system, comprising:
    a multiplicity of first nodes, each allocated to a subarea of a geographical area covered by the radio access network, the first nodes to exchange useful data between terminals located in their respective subarea and a primary network; and
    at least one second node having a plurality of functional units, designated as signaling functionalities, each functional unit to exchange signaling data with one terminal, the second node being connected to a plurality of first nodes to exchange signaling data with a terminal via the respective first node with which the terminal exchanges useful data, wherein
    the first nodes have a multiplicity of transport functionalities, each transport functionality being assigned to a terminal to exchange the useful data with the terminal, and
    each of the signaling functionalities are assigned an address to exchange signaling data, each of the transport functionalities are assigned an address to exchange useful data, the address to exchange useful data and the address to exchange signaling data being different for the same terminal.

2. The radio access network according to claim 1 wherein an administration unit is provided to assign a signaling functionality to a terminal upon the terminal's initiation of a communication with the radio access network.

3. The radio access network according to claim 2, wherein the radio access network has one second node, the second node being connected to every first node.

4. The radio access network according to claim 3, wherein a multiplicity of second nodes are provided, each second node being connected to a respective first node designated as its core node, and each second node also being connected to each first node located in a subarea adjoining the subarea of the respective core node.

5. The radio access network according to claim 4, wherein each first node serves as a core node for at least one second node.

6. The radio access network according to claim 1, wherein the radio access network has one second node, the second node being connected to every first node.

7. The radio access network according to claim 6, wherein each first node serves as a core node for at least one second node.

8. The radio access network according to claim 1, wherein a multiplicity of second nodes are provided, each second node being connected to a respective first node designated as its core node, and each second node also being connected to each first node located in a subarea adjoining the subarea of the respective core node.

9. A method for the operation of a radio access network for a mobile radio communications system, comprising:
providing a multiplicity of first nodes, each first node being allocated to a subarea of a geographical area covered by the radio access network;
providing a multiplicity of functional units designated as transport functionalities for the first nodes such that each subarea has a plurality of corresponding transport functionalities, each of the transport functionalities being assigned to one or more terminals located in the corresponding subarea to exchange useful data with the respective terminal;
providing at least one second node, the second node having a plurality of functional units, designated as signaling functionalities, for exchanging signaling data with respective terminals;
assigning a transport functionality to a terminal when a communication is set up between the terminal and the radio access network;
assigning a signaling functionality to a terminal when a communication is set up between the terminal and the radio access network;
sending signaling data from the signaling functionality to the terminal via the corresponding first node;
assigning a new transport functionality to the terminal when the terminal moves from a first subarea into a second subarea allocated to another first node; and
sending signaling data from the signaling functionality to the terminal via the other first node.

10. The method according to claim 9, wherein the transport functionalities and the signaling functionalities assigned to a terminal comprise different addresses, and the useful data and the signaling data directed to the terminal are conveyed within the radio access network using these different addresses.

11. The method according to claim 10, wherein the respective signaling functionality is notified when the terminal moves into a second subarea, and the signaling functionality thereafter sends signaling data directed to the terminal to the first node allocated to the second subarea.

12. The method according to claim 11, wherein
the radio access network comprises a multiplicity of second nodes, each second node being connected to a first node designated as its core node, each second node also connected to every first node located within a subarea adjoining the respective subarea of the core node, and
upon initiation of a communication between a terminal and the radio access network, a signaling functionality is assigned to the terminal, the signaling functionality being located within the respective second node served by the core first node where the terminal is located.

13. The method according to claim 9, wherein
the radio access network comprises a multiplicity of second nodes, each second node being connected to a first node designated as its core node, each second node also connected to every first node located within a subarea adjoining the respective subarea of the core node, and
upon initiation of a communication between a terminal and the radio access network, a signaling functionality is assigned to the terminal, the signaling functionality being located within the respective second node served by the core first node where the terminal is located.

* * * * *